Patented Feb. 28, 1933

1,899,896

UNITED STATES PATENT OFFICE

ROBERT B. LEBO, OF ELIZABETH, AND HERBERT G. M. FISCHER, OF WESTFIELD, NEW JERSEY, ASSIGNORS TO STANDARD OIL DEVELOPMENT COMPANY, A CORPORATION OF DELAWARE

PRODUCTION OF SODIUM SULPHHYDRATE AND SODIUM SULPHIDE

No Drawing. Application filed May 5, 1931. Serial No. 535,304.

This invention relates to the production of alkali sulphides from mixtures containing hydrogen sulphide and organic sulphides, and especially to gases of a petroleum origin.

Various methods have been proposed for the formation of alkali sulphides, particularly sodium sulphide, from refinery gases, resulting from the distillation or cracking of petroleum. Such methods have been proposed generally for the purpose of purifying the gas of reactive sulphur compounds. Attempts to utilize the sulphides resulting from the usual treatment of refinery gases with caustic soda have been generally unsatisfactory for the reason that small amounts of mercaptans or other organic sulphur compounds also react with the caustic soda with the formation of sodium mercaptides and the like which are exceedingly difficult to remove during subsequent crystallization and purification of the sodium sulphide. These mercaptides render the sulphides produced unsuitable for many industrial uses, both because of the addition of organic matter and more especially because of the intolerable odors introduced. Means for avoiding the absorption of mercaptans and similar reactive sulphur compounds which are characterized by higher molecular weight and higher boiling point than hydrogen sulphide, have been proposed. These consist essentially in removal of such compounds from the gas by selective adsorption, fractionation or other means prior to the treatment of the gas with caustic soda, as described in the co-pending application No. 519,234, filed February 28, 1931, by Mann and Lebo.

It has now been found that such preliminary treatments are unnecessary and that a solution of sodium sulphhydrate substantially free from organic sulphides may be prepared directly from the refinery gas by scrubbing the same with a caustic soda solution if this invention is followed.

In this improved method an excess of refinery gas is passed through the caustic soda solution to render it substantially saturated with hydrogen sulphide under the conditions used, the caustic soda being converted to sodium sulphhydrate. By this method the organic sulphur compounds originally absorbed are selectively displaced from combination with caustic soda by the hydrogen sulphide, and their solubility in the liquor is simultaneously decreased. The mechanism of the process may differ from that described and it is understood that the invention is not to be limited thereto, but it has been found that the passing of an excess of the gas to be absorbed through the caustic soda solution results in a solution substantially free from organic sulphur compounds and possessing none of the disagreeable properties adhering thereto.

It is desirable to use such liquor concentrations and temperatures that separation of solid sodium sulphides is avoided during the absorption. An aqueous solution containing 20 to 40% of sodium hydroxide and absorption temperatures of 80 to 100° F. have been found satisfactory for the process though these conditions may be varied widely.

Substantially pure sodium sulphhydrate may then be crystallized from the solution or an amount of caustic soda equivalent to the sodium sulphhydrate may be added to the solution, if sodium sulphide is desired as a product. The solution may be heated to flocculate any compounds of iron which may be present, which may then be removed prior to the crystallization, and the product may be recrystallized if greater purity is desired. Mother liquors from the crystallization steps may be reused in the conversion of sulphhydrate to sulphide, or may be returned to the absorption step.

The liquor obtained in this process is suitable for the preparation of good quality "flake" sodium sulphide of such purity and freedom from odors that it may be used even in the rayon industry without objection.

It is understood that the absorption of sulphides may be conducted with either batch or countercurrent operation, provided only that an excess of hydrogen sulphide is passed through the scrubbing liquor. Other alkalis may be used in place of caustic soda. The invention may also be applied to the production of sulphides or sulphhydrates from liquids containing hydrogen sulphide, such as the distillate from cracking oils, or other petroleum fractions, but it is generally preferred with refinery gases.

Our invention is not to be limited to any illustrative examples, nor to any theory of the mechanism of our process, but only by the following claims in which we wish to claim all novelty.

We claim:

1. An improved process for the production of sodium sulphhydrates substantially free from organic matter or mercaptan odors from gases containing both hydrogen sulphide and mercaptans which comprises, contacting an excess of the gas with an aqueous solution of caustic soda, the absorption capacity of the said solution for hydrogen sulphide being insufficient to absorb all the hydrogen sulphide of the gas, and withdrawing an aqueous solution of sodium sulphhydrate.

2. An improved process for the production of sodium sulphide substantially free from organic matter or mercaptan odors from gases containing both hydrogen sulphide and mercaptans which comprises preparing an aqueous solution of sodium sulphhydrate according to claim 1 and subsequently adding to said solution an equivalent amount of caustic soda.

3. Process according to claim 1 in which the gases are of petroleum origin.

4. Process according to claim 1 in which the caustic soda solution contains 20 to 40% caustic soda, and the absorption is conducted at a temperature between 80 and 100° F.

5. An improved process for the production of alkali sulphides, substantially free from mercaptans which comprises contacting a hydrocarbon mixture containing both hydrogen sulphide and organic sulphur compounds with an aqueous alkali hydroxide solution having an insufficient amount of hydroxide to combine with all the hydrogen sulphide, and withdrawing an aqueous solution of alkaline sulphides.

6. An improved process for the production of sodium sulphide which comprises contacting an excess of a hydrocarbon gas mixture resulting from petroleum refining and containing both hydrogen sulphide and organic sulphides, with an aqueous solution of sodium hydroxide having an insufficient amount of sodium hydroxide in aqueous solution to absorb all the hydrogen sulphide, withdrawing an aqueous solution of sodium sulphhydrate, adding thereto an equivalent amount of sodium hydroxide, and separating sodium sulphide from the solution.

ROBERT B. LEBO.
HERBERT G. M. FISCHER.